(12) United States Patent
Lev-Tov et al.

(10) Patent No.: US 9,971,764 B2
(45) Date of Patent: May 15, 2018

(54) SYSTEM AND METHOD FOR DISCOVERING AND EXPLORING CONCEPTS

(71) Applicant: GENESYS TELECOMMUNICATIONS LABORATORIES, INC., Daly City, CA (US)

(72) Inventors: Amir Lev-Tov, Bat-Yam (IL); Avraham Faizakof, Kfar-Warburg (IL); David Ollinger, San Francisco, CA (US); Yochai Konig, San Francisco, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 655 days.

(21) Appl. No.: 13/952,459

(22) Filed: Jul. 26, 2013

(65) Prior Publication Data

US 2015/0032452 A1   Jan. 29, 2015

(51) Int. Cl.
  *G10L 15/00* (2013.01)
  *G06F 17/30* (2006.01)
  (Continued)

(52) U.S. Cl.
  CPC ...... *G06F 17/2785* (2013.01); *G06F 17/3071* (2013.01); *G10L 15/1822* (2013.01)

(58) Field of Classification Search
  CPC .................................................. G10L 15/063
  (Continued)

(56) References Cited

U.S. PATENT DOCUMENTS 6,185,527 B1 * 2/2001 Petkovic ........... G06F 17/30746
                                                  704/231
8,401,986 B1   3/2013 Franke
(Continued)

FOREIGN PATENT DOCUMENTS

EP         0590942 A2    1/1999
KR       100380947 B1    4/2003
WO    WO 2015/013554 A1  1/2015

OTHER PUBLICATIONS

Pei, Jian et al., Mining Sequential Patterns by Pattern-Growth: The PrefixSpan Approach, IEEE Transactions on Knowledge and Data Engineering, Oct. 2004, 17 pages, vol. 16, No. 10, IEEE Computer Society.

(Continued)

*Primary Examiner* — Daniel Washburn
*Assistant Examiner* — Timothy Nguyen
(74) *Attorney, Agent, or Firm* — Lewis Roca Rothgerber Christie LLP

(57) ABSTRACT

A method for identifying concepts in a plurality of interactions includes: filtering, on a processor, the interactions based on intervals; creating, on the processor, a plurality of sentences from the filtered interactions; computing, on the processor, a saliency of each the sentences; pruning away, on the processor, sentences with low saliency for generating a set of informative sentences; clustering, on the processor, the sentences of the set of informative sentences for generating a plurality of sentence clusters, each of the clusters corresponding to a concept of the concepts; computing, on the processor, a saliency of each of the clusters; and naming, on the processor, each of the clusters.

17 Claims, 15 Drawing Sheets

(51) Int. Cl.
*G06F 17/27* (2006.01)
*G10L 15/18* (2013.01)

(58) Field of Classification Search
USPC .......................................................... 704/245
See application file for complete search history.

(56) References Cited

U.S. PATENT DOCUMENTS

| | | | |
|---|---|---|---|
| 8,762,301 | B1 | 6/2014 | Buckbee, Jr. |
| 9,015,194 | B2 | 4/2015 | Ziv et al. |
| 9,092,802 | B1 | 7/2015 | Akella |
| 2002/0188587 | A1* | 12/2002 | McGreevy ........ G06F 17/30666 |
| 2003/0028327 | A1 | 2/2003 | Brunner et al. |
| 2003/0069877 | A1* | 4/2003 | Grefenstette ..... G06F 17/30643 |
| 2003/0120640 | A1 | 6/2003 | Ohta et al. |
| 2003/0130991 | A1 | 7/2003 | Reijerse et al. |
| 2003/0149586 | A1 | 8/2003 | Chen et al. |
| 2005/0043922 | A1 | 2/2005 | Weidl et al. |
| 2005/0138483 | A1 | 6/2005 | Hatonen et al. |
| 2006/0004561 | A1* | 1/2006 | Zhang ................ G06F 17/3071 704/4 |
| 2007/0033185 | A1 | 2/2007 | Maag |
| 2007/0219992 | A1 | 9/2007 | Bollinger et al. |
| 2007/0220030 | A1 | 9/2007 | Bollinger et al. |
| 2008/0109425 | A1 | 5/2008 | Yih et al. |
| 2008/0181390 | A1 | 7/2008 | Kummamuru |
| 2008/0183704 | A1 | 7/2008 | Miller et al. |
| 2009/0300486 | A1 | 12/2009 | Zhu et al. |
| 2010/0153321 | A1* | 6/2010 | Savvides ............... G06F 17/271 706/13 |
| 2010/0161612 | A1* | 6/2010 | Chen ................ G06F 17/30719 707/738 |
| 2011/0167064 | A1* | 7/2011 | Achtermann ..... G06F 17/30598 707/737 |
| 2011/0178965 | A1 | 7/2011 | Pucher |
| 2011/0238410 | A1 | 9/2011 | Larcheveque et al. |
| 2011/0295903 | A1* | 12/2011 | Chen ................ G06F 17/30598 707/794 |
| 2012/0005532 | A1 | 1/2012 | Li et al. |
| 2012/0016678 | A1* | 1/2012 | Gruber ................ G06F 17/3087 704/275 |
| 2012/0096316 | A1 | 4/2012 | Suit |
| 2012/0166180 | A1 | 6/2012 | Au |
| 2012/0188879 | A1 | 7/2012 | Huang |
| 2013/0231920 | A1 | 9/2013 | Mathew et al. |
| 2013/0305356 | A1 | 11/2013 | Cohen-Ganor et al. |
| 2013/0339005 | A1 | 12/2013 | Zhang |
| 2014/0225757 | A1 | 8/2014 | Raichelgauz et al. |
| 2015/0032746 | A1 | 1/2015 | Lev-Tov et al. |

OTHER PUBLICATIONS

Ye, Hui et al., A Clustering Approach to Semantic Decoding, 4 pages, Cambridge University Engineering Department Trumpington Street, Cambridge, England.

International Search Report and Written Opinion for PCT/US2014/048089, mailed on Nov. 25, 2014, 13 pages.

Extended European Search Report for European Application No. 14828714.7, dated Jun. 20, 2016, 13 pages.

Korean Office action with English Translation for Application No. 10-2016-7005393, dated Mar. 28, 2017, 11 pages.

Korean Decision of Rejection with English Translation for Application No. 10-2016-7005393 dated Jan. 26, 2018, 5 pages.

* cited by examiner

Dataset Filters
(Standard Search Parameters)

Items on Report

Target Topic (Optional)    Minimum Lift    Minimum Confidence

[None Selected ▼]    [    ]    [ 70 ]

Run Report

| Left Hand Side | | Right Hand Side | Support ⇅ | Confidence ▼ | Lift ⇅ | Saliency ⇅ |
|---|---|---|---|---|---|---|
| Transfer + Dispute | → | Dissatisfaction | 70.0 | 90.0 | 1.5 | 15.0 |
| No Payment + On Hold | → | Dissatisfaction | 70.0 | 85.5 | 2.0 | 15.5 |
| Collection Closed | → | Urgency + Courtesy | 65.0 | 85.0 | 2.0 | 10.0 |
| Positive Feedback | → | Buying + Sympathy | 65.0 | 77.5 | 1.0 | 8.0 |
| Infringement + Claim | → | Fraud | 60.0 | 75.0 | 1.0 | 8.0 |

FIG. 9

SYSTEM AND METHOD FOR DISCOVERING AND EXPLORING CONCEPTS

CROSS-REFERENCE TO RELATED APPLICATION

This application is related to U.S. patent application Ser. No. 13/952,470, filed on Jul. 26, 2013, the entire disclosure of which is incorporated herein by reference.

FIELD

Aspects of the present invention relate to speech processing, indexing, searching, and analytics. In particular, aspects of the present invention relate to analyzing recorded and live information to categorize conversations and to identify concepts and trends.

BACKGROUND

An organization's contact center typically receives a multitude of calls regarding a variety of issues. For example, a sales department of a contact center may receive calls with questions about the feature sets and pricing of various products offered by the organization; a customer support department may receive calls regarding particular problems with using the products or the quality of the services being delivered; an accounts department may receive calls about changes in billing policy, incorrect charges, and other issues.

Generally, it is useful for an organization to be able to identify concepts and patterns within the conversations (or "interactions") in order to categorize the calls and identify underlying issues to be addressed (e.g., specific complaints about products or general dissatisfaction with services). However, conventional systems for doing so generally involve the manual survey of data collected by customer support agents and manual analysis of this data. This manual process of analysis can be time consuming and there may be long delays between collecting the data and determining results from the analysis.

In some conventional systems, conversations can be tagged or categorized based on their containing predefined keywords or phrases. For example, through the above discussed manual (human) analysis of phrases that are either identified by a human listener or identified by a computer system using phrase recognition, one might infer that conversations with a call center that contain the phrases "I would like to speak to your manager" and "Can I talk to your supervisor?" lead to the escalation of the call to a higher level representative. As such, any call containing these phrases would be categorized as containing an "escalation attempt."

As such, an organization can identify trends and infer conditions based on the number of such interactions falling into various categories. For example, a large number of interactions originating from a particular area and categorized as indicating a "service outage" or "poor network performance" could alert an interne service provider to take action to address system problems within that particular area.

However, conversations containing phrases that were not previously identified would not be categorized appropriately. For example, if the phrase "Let me talk to your boss" was not previously identified as being associated with escalation attempts, then a conversation containing that phrase would not be categorized as an "escalation attempt."

In addition, some conventional systems use Bayesian networks to identify correlations between events. However, developing these Bayesian networks requires human input to specify various parameters (e.g., the nodes of the Bayesian network).

SUMMARY

Aspects of embodiments of the present invention are directed to addressing two issues related to discovery and exploration of data. One aspect of the present invention is directed to the automatic discovery and extraction of concepts from a set of documents without human assistance. In addition, embodiments of the present invention are directed to understanding why a certain document or phone call is classified into a predefined category or why the document or phone call contains a particular concept (which may be newly identified). In other words, embodiments of the present invention are directed to discovering what is the "root cause" for various "symptoms" reported by customers and inferring a predefined category or newly discovered concept "A" that is the root cause for the call to be categorized with a predefined category or newly discovered concept "B", so an organization or a user can resolve the underlying issue.

According to one embodiment of the present invention, a method for identifying concepts in a plurality of interactions includes: filtering, on a processor, the interactions based on intervals; creating, on the processor, a plurality of sentences from the filtered interactions; computing, on the processor, a saliency of each the sentences; pruning away, on the processor, sentences with low saliency for generating a set of informative sentences; clustering, on the processor, the sentences of the set of informative sentences for generating a plurality of sentence clusters, each of the clusters corresponding to a concept of the concepts; computing, on the processor, a saliency of each of the clusters; and naming, on the processor, each of the clusters.

The interactions may include an output of a voice recognition system.

The method may further include filtering the output of the voice recognition system based on word confidence.

The voice recognition system may be a large-vocabulary continuous speech recognition system.

The intervals may be time intervals.

The clustering the sentences may include: selecting a plurality of template sentences from the set of informative sentences, each of the template sentences corresponding to one of the clusters; computing a similarity of each sentence in the set of informative sentences to the template sentences; assigning each of the sentences of the set of informative sentences to a cluster of the clusters in accordance with the computed similarities with the template sentences; and removing clusters having fewer than a threshold number of assigned sentences.

The clustering the sentences may further include, iteratively, selecting additional template sentences from sentences that were not assigned to a cluster and repeating the selecting the plurality of template sentences, computing the similarity of each sentence to the template sentences; the assigning the each of the sentences to the clusters; and removing clusters having fewer than the threshold number of assigned sentences until all sentences are assigned or until an iteration limit is reached.

The naming each of the clusters may include, for each cluster: computing a term frequency-inverse document frequency for each sentence in the cluster and naming the cluster with a sentence of the cluster having the highest term frequency-inverse document frequency.

According to another embodiment of the present invention, a method for exploring concepts automatically identified in a plurality of interactions includes: receiving, on a processor, a query comprising a concept; retrieving, by the processor, a cluster containing the concept; and displaying the retrieved cluster, wherein the concepts are automatically identified by: filtering, on the processor, the interactions based on intervals; creating, on the processor, a plurality of sentences from the filtered interactions; computing, on the processor, a saliency of each the sentences; pruning away, on the processor, sentences with low saliency for generating a set of informative sentences; and clustering, on the processor, the sentences of the set of informative sentences for generating a plurality of sentence clusters, each of the clusters corresponding to a concept of the concepts.

According to one embodiment of the present invention, a computer system includes: a processor; and a memory, wherein the memory has stored thereon instructions that, when executed by the processor, causes the processor to identify concepts in a plurality of interactions by: filtering the interactions based on intervals; creating a plurality of sentences from the filtered interactions; computing a saliency of each the sentences; pruning away sentences with low saliency for generating a set of informative sentences; clustering the sentences of the set of informative sentences for generating a plurality of sentence clusters, each of the clusters corresponding to a concept of the concepts; computing a saliency of each of the clusters; and naming each of the clusters.

The interactions may include an output of a voice recognition system.

The instructions may further include instructions for filtering the output of the voice recognition system based on word confidence.

The voice recognition system may be a large-vocabulary continuous speech recognition system.

The intervals may be time intervals.

The clustering the sentences may include: selecting a plurality of template sentences from the set of informative sentences, each of the template sentences corresponding to one of the clusters; computing a similarity of each sentence in the set of informative sentences to the template sentences; assigning each of the sentences of the set of informative sentences to a cluster of the clusters in accordance with the computed similarities with the template sentences; and removing clusters having fewer than a threshold number of assigned sentences.

The clustering the sentences may further include, iteratively, selecting additional template sentences from sentences that were not assigned to a cluster and repeating the selecting the plurality of template sentences, computing the similarity of each sentence to the template sentences; the assigning the each of the sentences to the clusters; and removing clusters having fewer than the threshold number of assigned sentences until all sentences are assigned or until an iteration limit is reached.

The naming each of the clusters may include, for each cluster: computing a term frequency-inverse document frequency for each sentence in the cluster and naming the cluster with a sentence of the cluster having the highest term frequency-inverse document frequency.

According to one embodiment of the present invention, a computer system includes: a processor; and a memory, wherein the memory has stored thereon instructions that, when executed by the processor, causes the processor to respond to requests for exploration of concepts by: receiving a query comprising a concept; retrieving a cluster containing the concept; and displaying the retrieved cluster, wherein the concepts are automatically identified by: filtering the interactions based on intervals; creating a plurality of sentences from the filtered interactions; computing a saliency of each the sentences; pruning away sentences with low saliency for generating a set of informative sentences; and clustering the sentences of the set of informative sentences for generating a plurality of sentence clusters, each of the clusters corresponding to a concept of the concepts.

BRIEF DESCRIPTION OF THE DRAWINGS

FIG. 9 is a screenshot listing deduced association rules between causes and events along with support, confidence, lift, and saliency levels for each of the derived inference rules according to one embodiment of the present invention.

DETAILED DESCRIPTION

Figure 1:
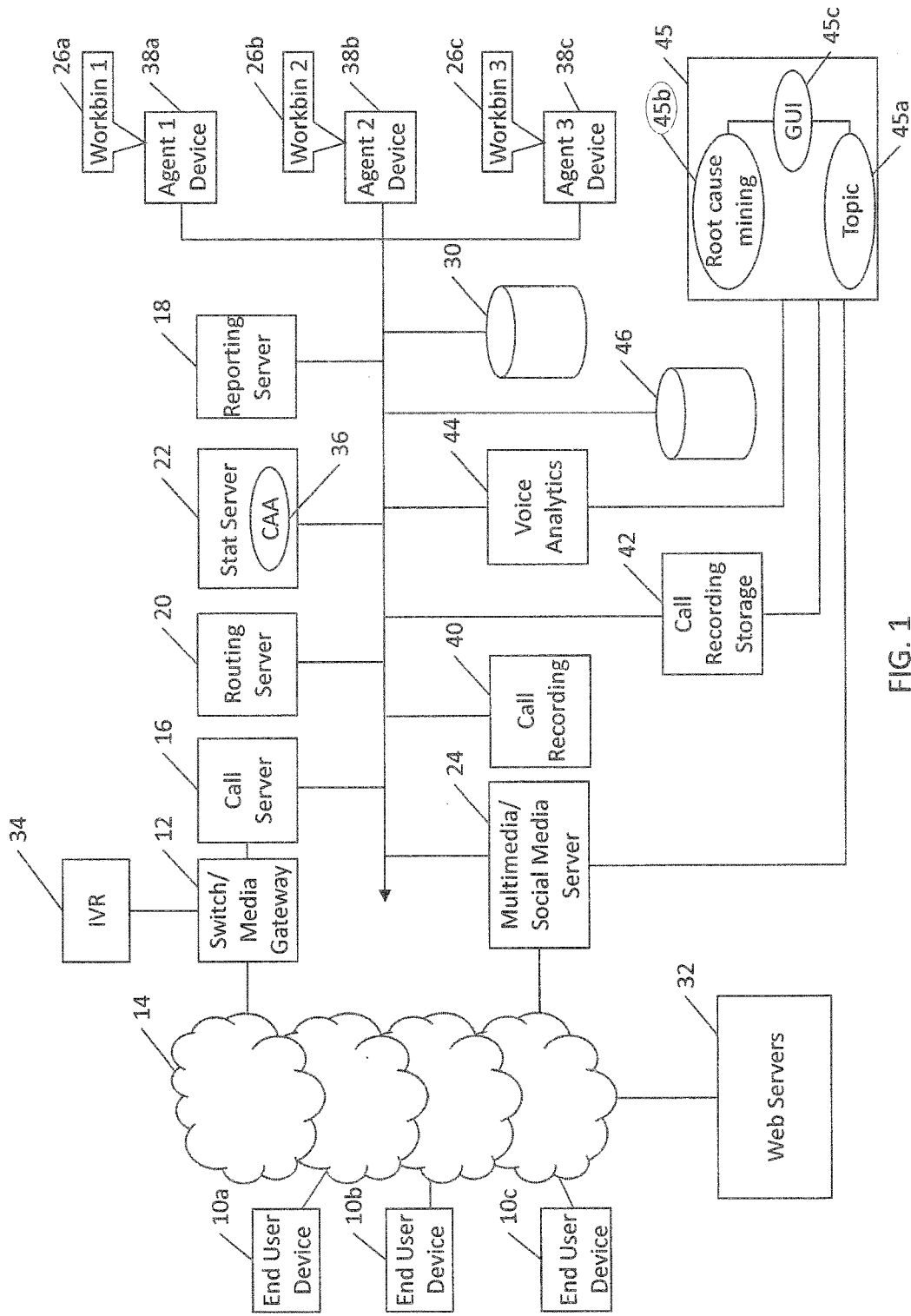
FIG. 1 is a schematic block diagram of a system supporting a contact center that is configured to provide access to searchable transcripts to customer service agents according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Some embodiments of the present invention will be described in the context of a contact center. However, embodiments of the present invention are not limited thereto and may also be used in under other conditions involving searching recorded audio such as in computer based education systems, voice messaging systems, medical transcripts, or any speech corpora from any source.

Aspects of embodiments of the present invention are directed to a system and method for automatically inferring and deducing topics of discussion (or "concepts") from a body of recorded or live interactions (or conversations). These interactions may include, for example, telephone conversations, text-based chat sessions, email conversation threads, and the like. The inferring of these concepts does not require manual categorization by a human and can be performed by the system (or the "analytics system") according to embodiments of the present invention. Therefore, new, previously unidentified topics of conversation can quickly be identified and brought to the attention of an organization without performing a manual analysis of conversation logs.

For example, suppose a company released a new version product that added Bluetooth® connectivity and there were no predefined categories in the interactions analytics system to match the phrases "Bluetooth connection" or "Bluetooth pairing" to issues with Bluetooth® connections. In conventional systems, this category might go undetected until those phrases were manually added to the analytics system.

In contrast, embodiments of the present invention are directed to a system and method for identifying salient phrases, generating new categories (or "concepts") based on these identified phrases, and categorizing interactions based on these automatically identified categories. As a result, embodiments of the present invention can be used to alert organizations to newly trending topics within interactions (e.g., conversations with customers), thereby allowing faster responses to changing circumstances. See, e.g., FIG. 3, which is a screenshot of a portion of a category distribution report 1 showing exemplary categories "New Customer," "Emergency," "Identification," "Billing," and "Payment Inquiry" along the number of interactions categorized into each of these categories and the percentages of all calls that involve these categories. Note that the percentages add up to more than 100% because any given interaction may be assigned to multiple categories or not assigned to any category. Viewing this category distribution report, an organization can assess the most frequently discussed topics.

Another aspect of embodiments of the present invention is directed to systems and methods for automatically determining possible root causes of events and concepts within a conversation. For example, an internet service provider may be alerted to a large number of requests to cancel service plans. Using embodiments of the present invention, the organization would be able to view association rules (or inference rules) automatically deduced from the interactions to identify one or more causes (or "root causes") of these events based on other categories and concepts appearing in the interaction. See, e.g., FIG. 9, which is a screenshot listing deduced association rules between causes (labeled "Left Hand Side") and events (labeled "Right Hand Side") along with support, confidence, lift, and saliency levels for each of the derived inference rules according to one embodiment of the present invention. A user can search for rules relating to a particular topic (e.g., customer "Dissatisfaction") by selecting the topic from the "Target Topic" drop-down box, in which case rules containing "Dissatisfaction" on the "Right Hand Side" will be shown. In the example shown in FIG. 9, the rules "Transfer+Dispute→Dissatisfaction" and "No Payment+On Hold→Dissatisfaction" would be shown among the rules involving the "Dissatisfaction" concept.

Therefore, embodiments of the present invention are directed to systems and methods for providing timely summary of trends in topics of discussion in a collection of interactions and systems and methods for determining root causes of predefined and inferred topics of discussion based on, for example, correlations with particular other topics within the same interaction.

In one embodiment, the above-described systems and methods are used in the context of a contact center and are used to monitor and infer topics of conversation during interactions between customers and an organization and to analyze and determine root causes of events for display to members of the organization.

FIG. 1 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call.

In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22. According to one exemplary embodiment of the invention, the statistics server 22 includes a customer availability aggregation (CAA) module 36 for monitoring availability of end users on different communication channels and providing such information to, for example, the routing server 20, agent devices 38a-38c, and/or other contact center applications and devices. The CAA module may also be deployed in a separate application server. The aggregation module 36 may be a software module implemented via computer program instructions which are stored in memory of the statistics server 22 (or some other server), and which program instructions are executed by a processor. A person of skill in the art should recognize that the aggregation module 36 may also be implemented via firmware (e.g. an application-specific integrated circuit), hardware, or a combination of software, firmware, and hardware.

According to one exemplary embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The multimedia/social media server 24 may also be configured to monitor and track interactions on those websites.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the contact center also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment of the present invention, the contact center 102 also includes a call recording server 40 for recording the audio of calls conducted through the contact center 102, a call recording storage server 42 for storing the recorded audio, a speech analytics server 44 configured to process and analyze audio collected in the from the contact center 102, and a speech index database 46 for providing an index of the analyzed audio.

The speech analytics server 44 may be coupled to (or may include) an analytics server 45 including a topic detecting module 45*a*, a root cause mining module 45*b*, and a user interface module 45*c*. The analytics server 45 may be configured to provide the automatic detection of topics from interactions recorded by the call recording server 40 and stored on the call recording storage server 42. The analytics server 45 may also access data stored on, for example, the multimedia/social media server 24 in order to process interactions from various chat, social media, email, and other non-voice interactions.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Each of the various servers in the contact center may be a process or thread, running on one or more processors, in one or more computing devices 500 (e.g., FIG. 2A, FIG. 2B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers and other modules.

Figure 2A:
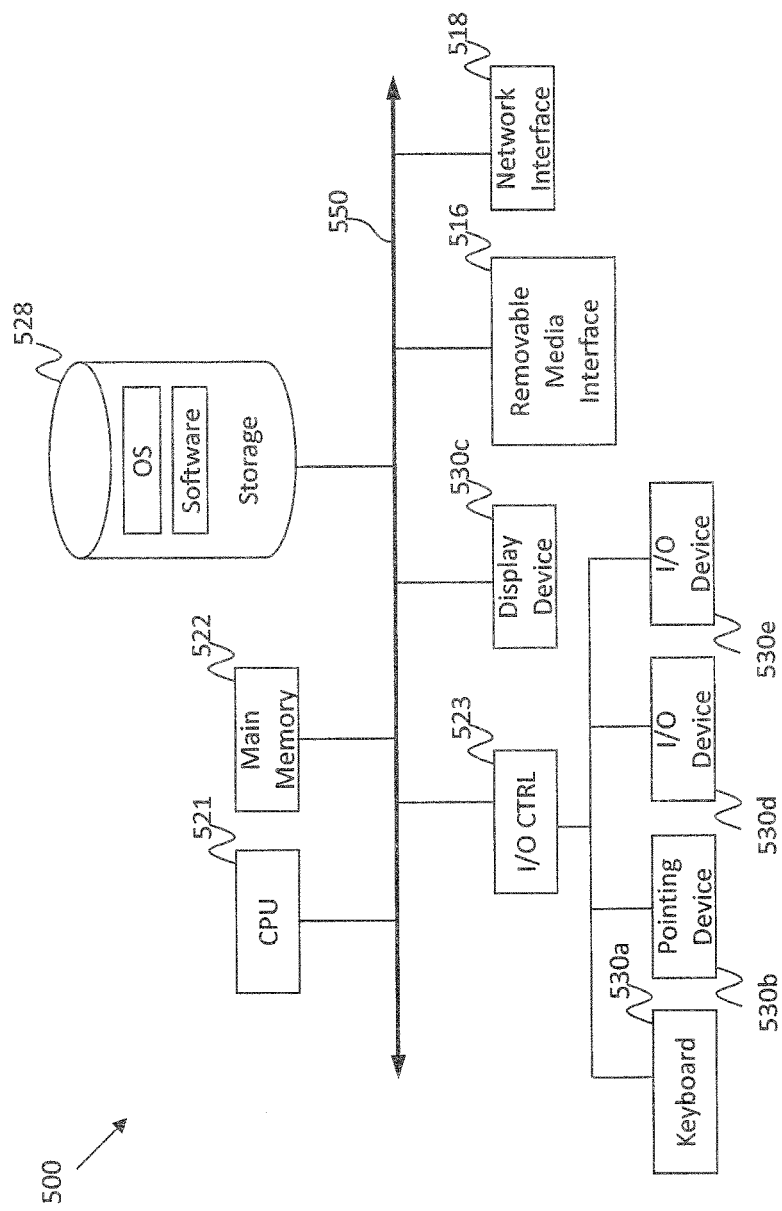
FIG. 2A is a block diagram of a computing device according to an embodiment of the present invention.
Figure 2B:
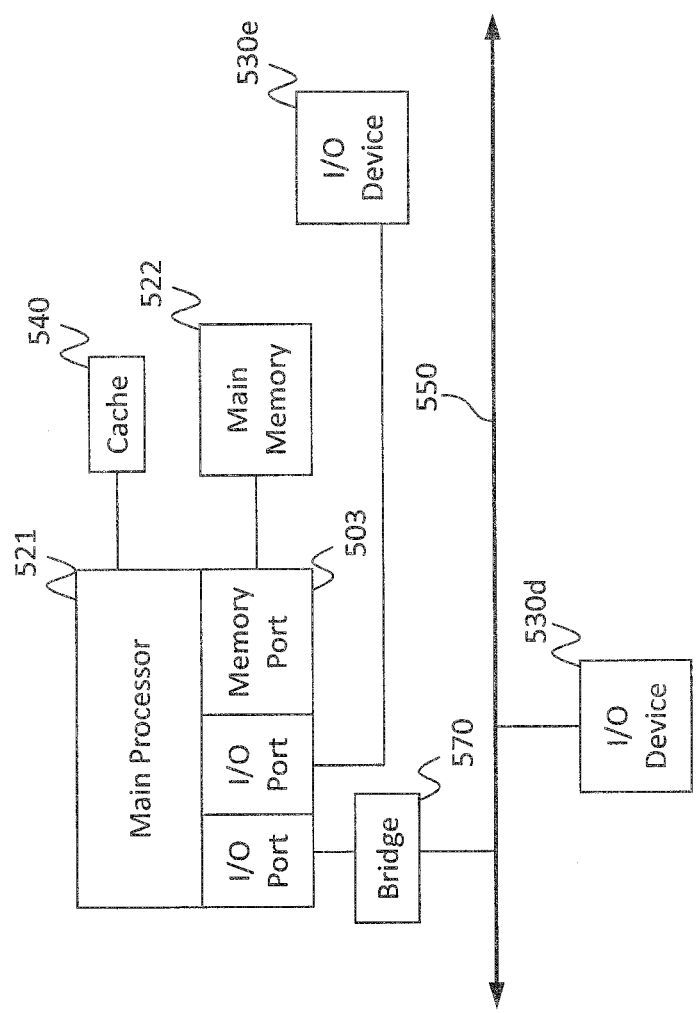
FIG. 2B is a block diagram of a computing device according to an embodiment of the present invention.

FIG. 2A and FIG. 2B depict block diagrams of a computing device 500 as may be employed in exemplary embodiments of the present invention. As shown in FIG. 2A and FIG. 2B, each computing device 500 includes a central processing unit 521, and a main memory unit 522. As shown in FIG. 2A, a computing device 500 may include a storage device 528, a removable media interface 516, a network interface 518, an input/output (I/O) controller 523, one or more display devices 530*c*, a keyboard 530*a* and a pointing device 530*b*, such as a mouse. The storage device 528 may include, without limitation, storage for an operating system and software. As shown in FIG. 2B, each computing device 500 may also include additional optional elements, such as a memory port 503, a bridge 570, one or more additional input/output devices 530*d*, 530*e* and a cache memory 540 in communication with the central processing unit 521. Input/output devices, e.g., 530*a*, 530*b*, 530*d*, and 530*e*, may be referred to herein using reference numeral 530.

The central processing unit 521 is any logic circuitry that responds to and processes instructions fetched from the main memory unit 522. It may be implemented, for example, in an integrated circuit, in the form of a microprocessor, microcontroller, or graphics processing unit (GPU), or in a field-programmable gate array (FPGA) or application-specific integrated circuit (ASIC). Main memory unit 522 may be one or more memory chips capable of storing data and allowing any storage location to be directly accessed by the central processing unit 521. In the embodiment shown in FIG. 2A, the central processing unit 521 communicates with main memory 522 via a system bus 550. FIG. 2B depicts an embodiment of a computing device 500 in which the central processing unit 521 communicates directly with main memory 522 via a memory port 503.

FIG. 2B depicts an embodiment in which the central processing unit 521 communicates directly with cache memory 540 via a secondary bus, sometimes referred to as a backside bus. In other embodiments, the central processing unit 521 communicates with cache memory 540 using the system bus 550. Cache memory 540 typically has a faster response time than main memory 522. In the embodiment shown in FIG. 2A, the central processing unit 521 communicates with various I/O devices 530 via a local system bus 550. Various buses may be used as a local system bus 550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 530*c*, the central processing unit 521 may communicate with the display device 530*c* through an Advanced Graphics Port (AGP). FIG. 2B depicts an embodiment of a computer 500 in which the central processing unit 521 communicates directly with I/O device 530*e*. FIG. 2B also depicts an embodiment in which local busses and direct communication are mixed: the central processing unit 521 communicates with I/O device 530d using a local system bus 550 while communicating with I/O device 530e directly.

A wide variety of I/O devices 530 may be present in the computing device 500. Input devices include one or more keyboards 530a, mice, trackpads, trackballs, microphones, and drawing tablets. Output devices include video display devices 530c, speakers, and printers. An I/O controller 523, as shown in FIG. 2A, may control the I/O devices. The I/O controller may control one or more I/O devices such as a keyboard 530a and a pointing device 530b, e.g., a mouse or optical pen.

Referring again to FIG. 2A, the computing device 500 may support one or more removable media interfaces 516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 530 may be a bridge between the system bus 550 and a removable media interface 516.

The removable media interface 516 may for example be used for installing software and programs. The computing device 500 may further comprise a storage device 528, such as one or more hard disk drives or hard disk drive arrays, for storing an operating system and other related software, and for storing application software programs. Optionally, a removable media interface 516 may also be used as the storage device. For example, the operating system and the software may be run from a bootable medium, for example, a bootable CD.

In some embodiments, the computing device 500 may comprise or be connected to multiple display devices 530c, which each may be of the same or different type and/or form. As such, any of the I/O devices 530 and/or the I/O controller 523 may comprise any type and/or form of suitable hardware, software, or combination of hardware and software to support, enable or provide for the connection to, and use of, multiple display devices 530c by the computing device 500. For example, the computing device 500 may include any type and/or form of video adapter, video card, driver, and/or library to interface, communicate, connect or otherwise use the display devices 530c. In one embodiment, a video adapter may comprise multiple connectors to interface to multiple display devices 530c. In other embodiments, the computing device 500 may include multiple video adapters, with each video adapter connected to one or more of the display devices 530c. In some embodiments, any portion of the operating system of the computing device 500 may be configured for using multiple display devices 530c. In other embodiments, one or more of the display devices 530c may be provided by one or more other computing devices, connected, for example, to the computing device 500 via a network. These embodiments may include any type of software designed and constructed to use the display device of another computing device as a second display device 530c for the computing device 500. One of ordinary skill in the art will recognize and appreciate the various ways and embodiments that a computing device 500 may be configured to have multiple display devices 530c.

A computing device 500 of the sort depicted in FIG. 2A and FIG. 2B may operate under the control of an operating system, which controls scheduling of tasks and access to system resources. The computing device 500 may be running any operating system, any embedded operating system, any real-time operating system, any open source operating system, any proprietary operating system, any operating systems for mobile computing devices, or any other operating system capable of running on the computing device and performing the operations described herein.

The computing device 500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 500 may be a virtualized computing device and the virtualized computing device may be running in a networked or cloud based environment. In some embodiments, the computing device 500 may have different processors, operating systems, and input devices consistent with the device.

In other embodiments the computing device 500 is a mobile device, such as a Java-enabled cellular telephone or personal digital assistant (PDA), a smart phone, a digital audio player, or a portable media player. In some embodiments, the computing device 500 comprises a combination of devices, such as a mobile phone combined with a digital audio player or portable media player.

Figure 2D:
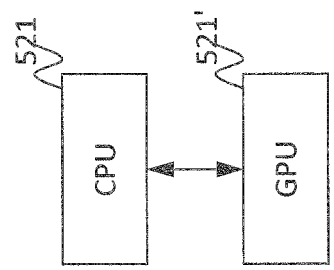
FIG. 2D is a block diagram of a computing device according to an embodiment of the present invention.
Figure 2C:
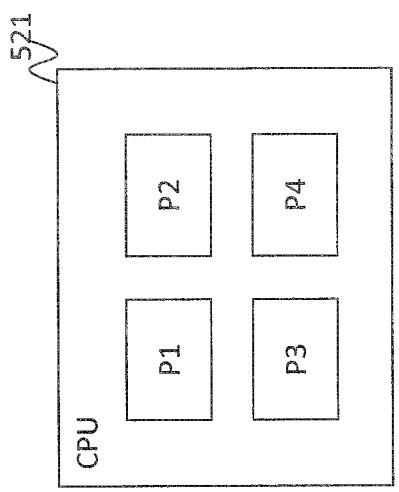
FIG. 2C is a block diagram of a computing device according to an embodiment of the present invention.

As shown in FIG. 2C, the central processing unit 521 may comprise multiple processors P1, P2, P3, P4, and may provide functionality for simultaneous execution of instructions or for simultaneous execution of one instruction on more than one piece of data. In some embodiments, the computing device 500 may comprise a parallel processor with one or more cores. In one of these embodiments, the computing device 500 is a shared memory parallel device, with multiple processors and/or multiple processor cores, accessing all available memory as a single global address space. In another of these embodiments, the computing device 500 is a distributed memory parallel device with multiple processors each accessing local memory only. In still another of these embodiments, the computing device 500 has both some memory which is shared and some memory which may only be accessed by particular processors or subsets of processors. In still even another of these embodiments, the central processing unit 521 comprises a multicore microprocessor, which combines two or more independent processors into a single package, e.g., into a single integrated circuit (IC). In one exemplary embodiment, depicted in FIG. 2D, the computing device 500 includes at least one central processing unit 521 and at least one graphics processing unit 521'.

In some embodiments, a central processing unit 521 provides single instruction, multiple data (SIMD) functionality, e.g., execution of a single instruction simultaneously on multiple pieces of data. In other embodiments, several processors in the central processing unit 521 may provide functionality for execution of multiple instructions simultaneously on multiple pieces of data (MIMD). In still other embodiments, the central processing unit 521 may use any combination of SIMD and MIMD cores in a single device.

Figure 2E:
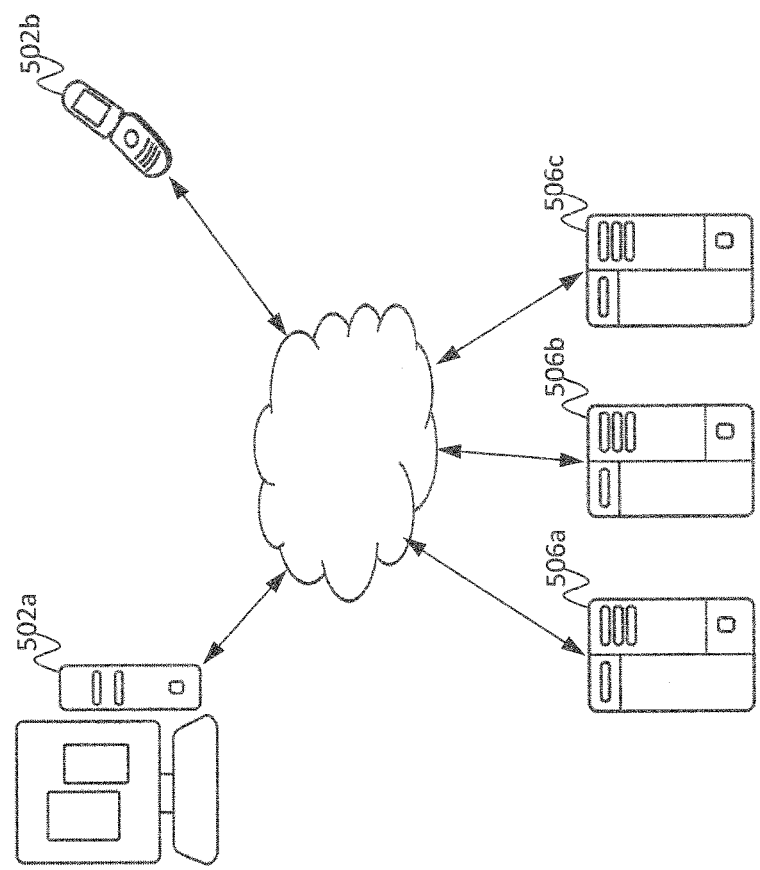
FIG. 2E is a block diagram of a network environment including several computing devices according to an embodiment of the present invention.

A computing device may be one of a plurality of machines connected by a network, or it may comprise a plurality of machines so connected. FIG. 2E shows an exemplary network environment. The network environment comprises one or more local machines 502a, 502b (also generally referred to as local machine(s) 502, client(s) 502, client node(s) 502, client machine(s) 502, client computer(s) 502, client device(s) 502, endpoint(s) 502, or endpoint node(s) 502) in communication with one or more remote machines 506a, 506b, 506c (also generally referred to as server machine(s) 506 or remote machine(s) 506) via one or more networks 504. In some embodiments, a local machine 502 has the capacity to function as both a client node seeking access to resources provided by a server machine and as a server machine providing access to hosted resources for other clients 502a, 502b. Although only two clients 502 and three server machines 506 are illustrated in FIG. 2E, there may, in general, be an arbitrary number of each. The network 504 may be a local-area network (LAN), e.g., a private network such as a company Intranet, a metropolitan area network (MAN), or a wide area network (WAN), such as the Internet, or another public network, or a combination thereof.

The computing device 500 may include a network interface 518 to interface to the network 504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 500 communicates with other computing devices 500 via any type and/or form of gateway or tunneling protocol such as Secure Socket Layer (SSL) or Transport Layer Security (TLS). The network interface 518 may comprise a built-in network adapter, such as a network interface card, suitable for interfacing the computing device 500 to any type of network capable of communication and performing the operations described herein. An I/O device 530 may be a bridge between the system bus 550 and an external communication bus.

According to various embodiments of the present invention, exploration and discovery technologies are directed toward discovering interesting phenomena without the user input—in other words, identifying information that is relevant to the user without the user explicitly looking for this information. Categorization technologies are focused on classifying documents (e.g., text, audio, and video) into predefined categories such as "all the calls in which a customer has asked to speak to a supervisor."

Figure 3:
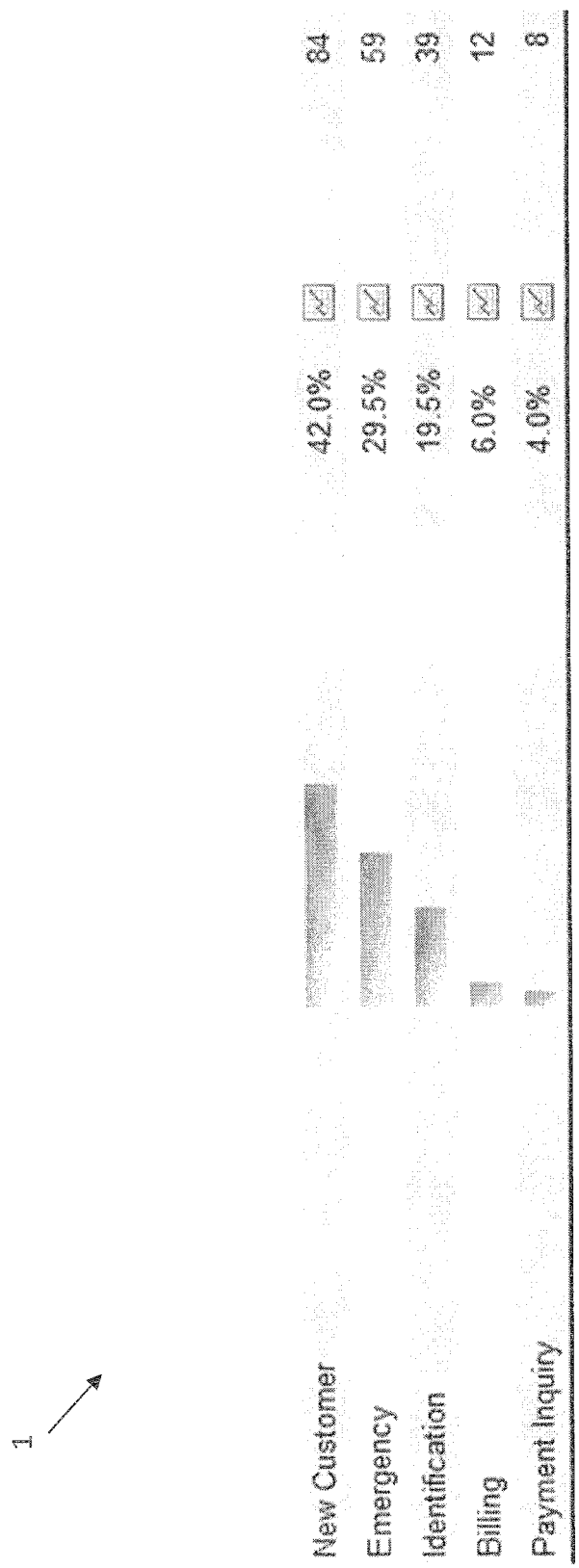
FIG. 3 is a screenshot of a category distribution report according to one embodiment of the present invention.

FIG. 3 is a screenshot of a category distribution report according to one embodiment of the present invention. In this report, the voice calls, customer-agent phone conversations (or interactions) that have occurred in the last 7 days have been classified into categories (e.g., predefined categories) that represent the set of known reasons for calls. In other embodiments, conversations are aggregated over different time periods (e.g., over the past day, over the past hour, over the past month, since a particular date, or between two arbitrary dates) may be aggregated. In addition, in other embodiments, the interactions may be limited to particular communication channels, such as one or more of telephone, email, chat, and social media, limited to interactions from particular contact centers, or limited to interactions from particular departments (e.g., sales or customer support).

Figure 4:
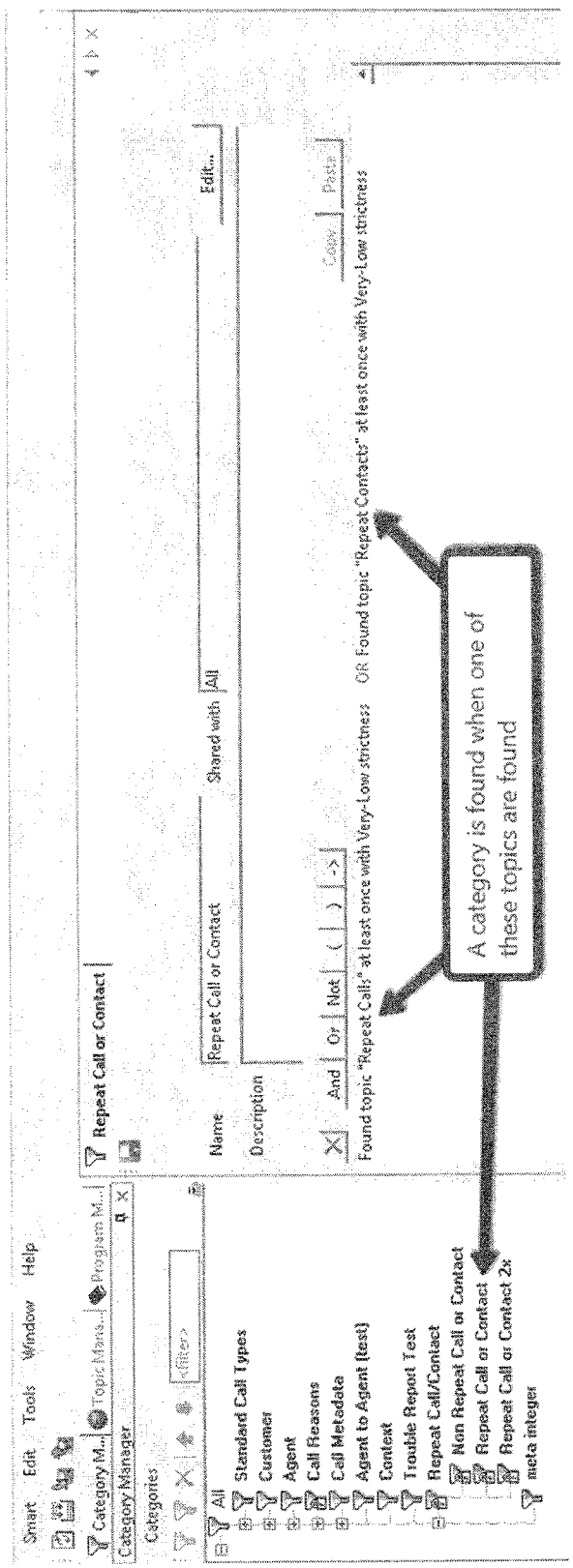
FIG. 4 is a screenshot illustrating an interface for customizing and defining predefined categories according to one embodiment of the present invention.

FIG. 4 is a screenshot illustrating an interface for customizing and defining predefined categories according to one embodiment of the present invention. Each predefined category can be defined as some Boolean expression of topics where each topic may be defined as a union of phrases or words, thereby producing a set of categorizing rules used to classify the interactions. For example, FIG. 4 illustrates the definition of the "Repeat Call or Contact" category, which is defined by interactions having 'Found topic "Repeat Calls" at least once with Very-Low strictness OR Found topic "Repeat Contacts" at least once with Very-Low strictness'. The "Repeat Calls" and "Repeat Contact" topics may be triggered, for example, by detecting particular triggering events such as a record of multiple calls from a particular phone number or by identifying particular phrases in the interaction such as "thanks for calling again".

When one of these phrases of the Boolean expression is spoken in a conversation, various speech recognition technologies can recognize it in the audio. (One such technology is phrase recognition as described in U.S. Pat. No. 7,487,094 "System and method of call classification with context modeling based on composite words" the content of which is incorporated herein by reference) In other embodiments, the interactions are conducted over other media (for example, text chat) and other appropriate methods of detecting phrases are used. Upon detecting one of these phrases, it triggers the detection of topics to which these phrases belong. The detection of topics feed the appropriate categorizing rules matching the given category are triggered and the interaction is labeled in accordance with the matching categories.

Therefore, according to one embodiment, the analytics server 45 can generate the category distribution report by counting the number of interactions within a given time period that fall within each category.

Figure 5:
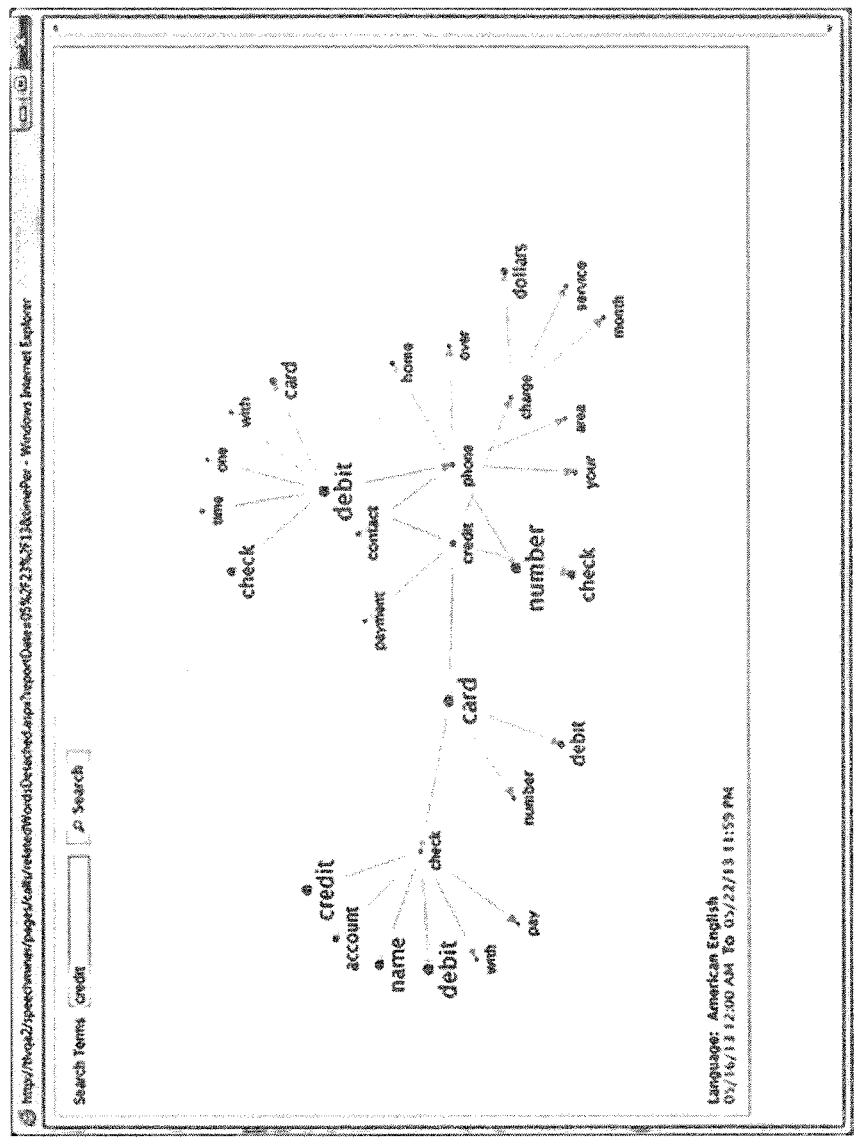
FIG. 5 is a screenshot illustrating an interface for exploring relationships between topics in a plurality of interactions according to one embodiment of the present invention.

According to one embodiment of the present invention, an analytics server 45 provides a user with the ability to view or "explore" related words, as illustrated, for example, in FIG. 5. A user can start from a single word and explore the co-occurrence of the starting word with other words in various conversations. For instance, FIG. 5 depicts the relationship or co-occurrence of the word "credit" with other words in the set of relevant calls.

According to one embodiment of the invention, the analytics server 45 and the topic detecting module 45a provide a user interface through user interface module 45c for a user to select a category from a set of categories (e.g., a set of predefined categories) and a group of calls that were classified into this category in a certain interval (e.g., last 7 days) and request information regarding why the group of calls were classified into the given category. The analytics server 45 and the user interface module 45c can present to the user, words and phrases that often occur and that are informative around occurrences of this category (e.g., words that appear with higher frequency than their occurrence in general within this category), thus characterizing the cause, or what is caused by, this category. Systems and methods for categorizing interactions will be described below with respect to FIG. 7.

Figure 6:
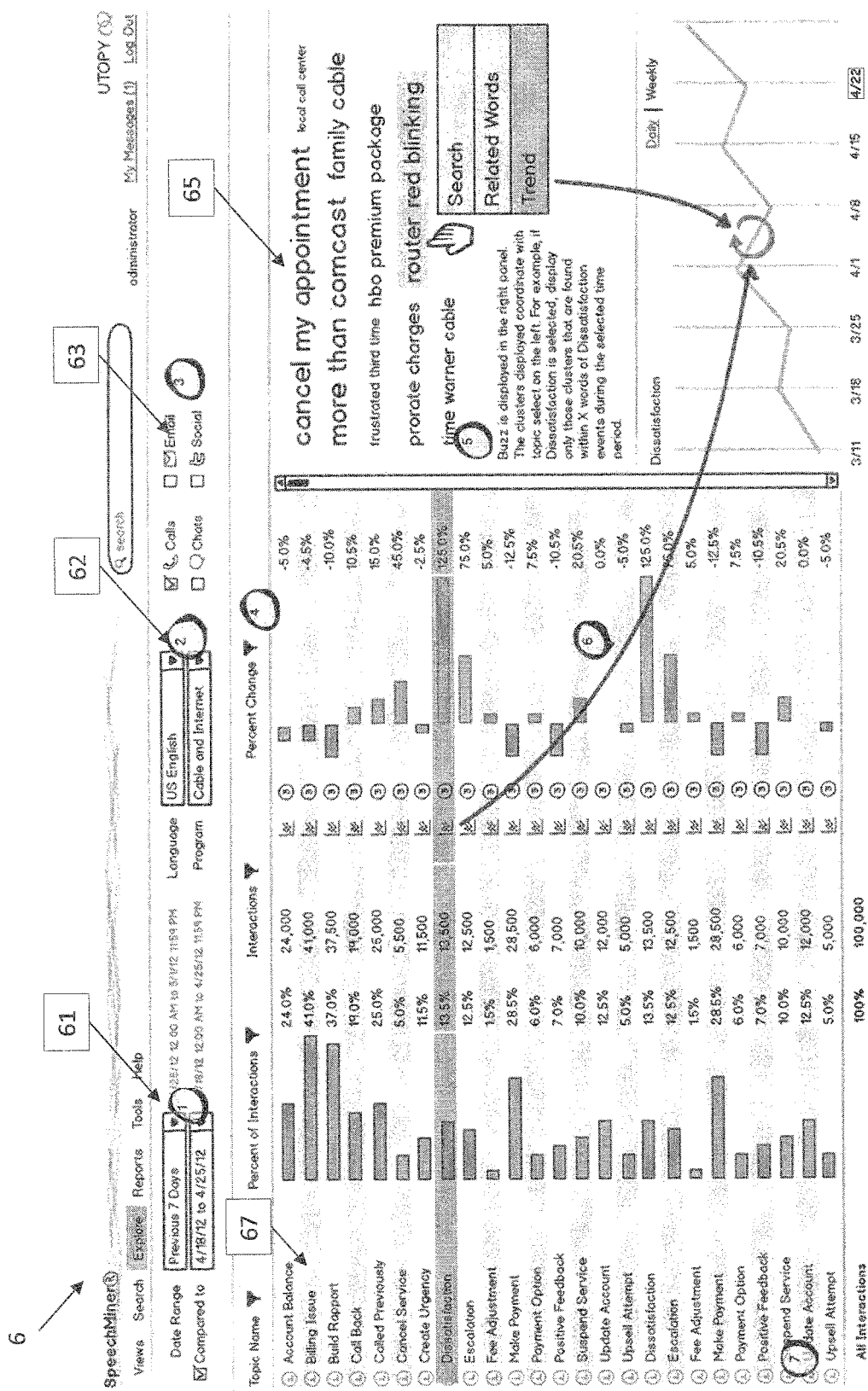
FIG. 6 illustrates a user interface for exploring clustering of key terms according to one embodiment of the present invention.

FIG. 6 illustrates a user interface 6 for exploring clustering of key terms (or "buzz around categories") according to one embodiment of the present invention. Referring to FIG. 6, a time range of documents may be specified in field 61. The language of the interactions (or documents) and general field (e.g., business category) may also be specified in field 62, and the types of interactions (e.g., audio from telephone calls, chats, email, and social media interactions) may be selected in checkboxes 63. As shown in FIG. 6, various defined categories 67 of calls, such as "Account Balance," "Billing Issue," "Escalation," "Dissatisfaction," and "Positive Feedback" are listed, with each row showing the percentage of interactions being classified into the given categories, the total number of interactions matching that category, and percentage change from a prior period (e.g., if the percentages currently shown are for the past week, the percentage change may be shown in comparison to, for example, two weeks ago or, as another example, the same week last year).

When a row corresponding to a category is selected (e.g., in FIG. 6, the "Dissatisfaction" row is selected), additional information regarding the selected category may be shown in pane 65 of the user interface. As seen in FIG. 6, phrases from the interactions that are common to interactions within the selected category are shown in pane 65. In some embodiments, the size of the words may correspond to the frequency with which the phrases appear in the interaction. In addition, in some embodiments the user interface may also show a graph showing the number of interactions in this category over time.

Figure 7:
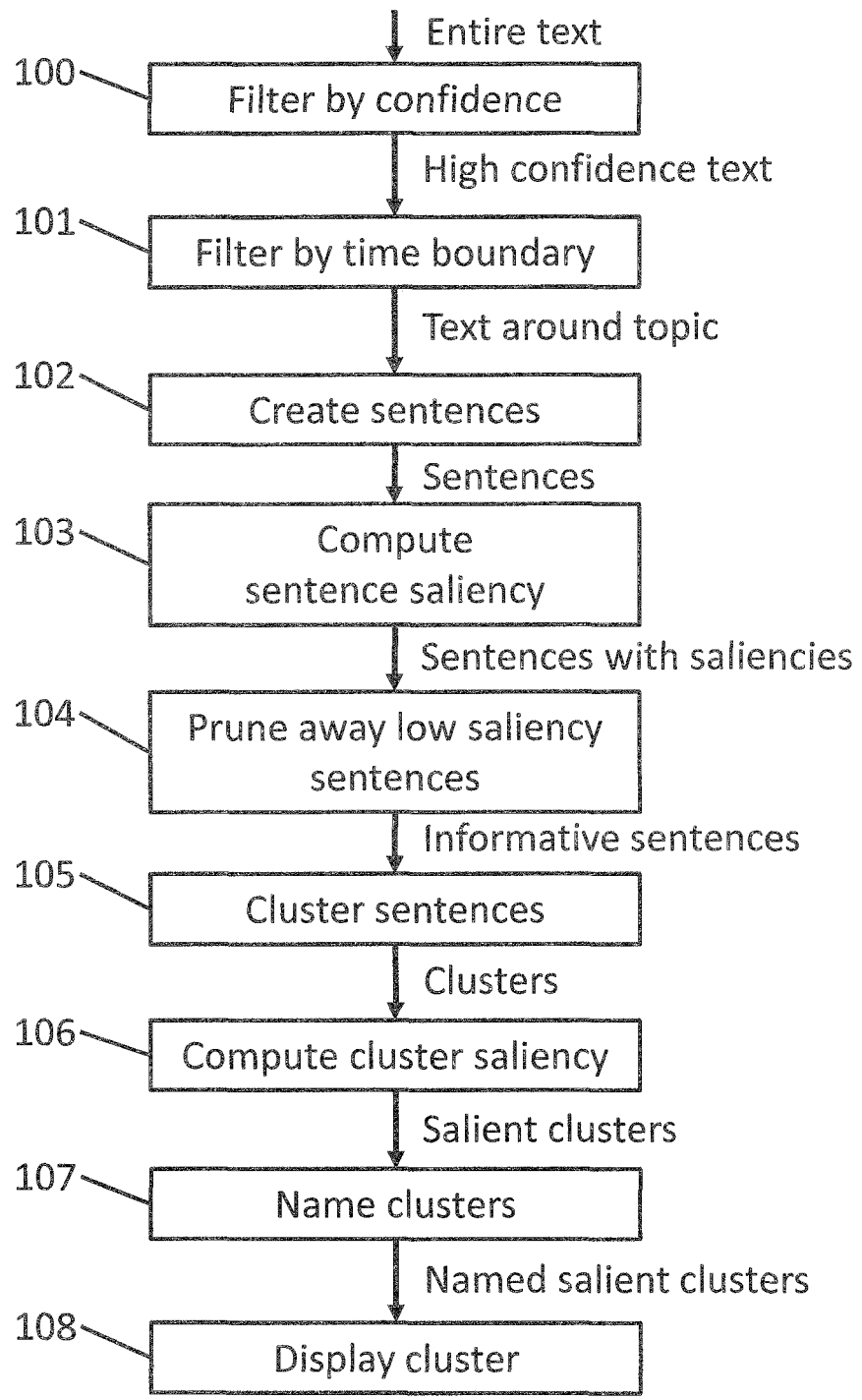
FIG. 7 is a flowchart illustrating a method for detecting topics within interactions according to one embodiment of the present invention.

FIG. 7 is a flowchart of a process executed by the analytics server 45 and the topic detecting module 45a for extracting concepts from interactions (e.g., text and text transcriptions of audio) according to one embodiment of the present invention. According to one embodiment, sentences that are semantically related are grouped together (or clustered) as conveying the same idea. Clustering is a machine learning technique that can be used to take sentences as input and to cluster the sentences together when the important portions of the sentences are appear to be the similar or the same. Each one of these clusters is a concept as mentioned above. Thus, to find buzz (or activity) around (or related to) particular categories, the text that appears around the location of a phrase associated with a category (for example, 30 seconds before and after the phrase), and perform the clustering on this text, as explained in more detail below.

Referring to FIG. 7, according to one embodiment of the present invention, concepts or phrases are extracted from interactions by supplying the entire body of interactions (or the entire body of text) to the system (e.g., the analytics server 45 as shown in FIG. 1, which may be a computer system 500 as shown in FIG. 2A, including the topic detecting module 45a as shown in FIG. 1) configured to perform the categorization.

When the interactions being processed are the output of large-vocabulary continuous speech recognition (LVCSR), then low confidence words are filtered out in operation 100 and only words with high confidence remain in the text to be processed. If the exploration is done on email, chat, or other text, the entire text is used.

For exploration around topics, according to one embodiment, only text from a within a particular time boundary before and after the topic recognition (e.g., 30 seconds before and after the topic) are used and other data is filtered out in operation 101.

In operation 102, "sentences" are created out of the filtered text. As used and defined herein, "sentence" refers to a block of consecutive words in the text and this block of words does not necessarily correspond to a particular grammatical or orthographical unit (e.g., a complete grammatical sentence or a sequence of words beginning with a capital letter and ending in a period). For example, in one embodiment, n-grams with overlaps (overlapping n-grams) are created, where n may be 4, which means that every consecutive 4-words form a "sentence." However, in other embodiments of the present invention, n can be any other whole number greater than 1. In addition, n-grams are merely one way to create sentences from words, and in other embodiments, other methods of forming "sentences" or blocks of consecutive worlds can be applied.

In operation 103, the saliency of a sentence is computed from the saliency of the words in the sentence. According to one embodiment, the inverse document frequency (IDF) of a word is used to measure the saliency of word w, and the saliency of the sentence is given by the square of the sum of the IDFs of each of the words in the sentence:

$$IDF(w) = \log\left(\frac{N}{DF(w)}\right)$$

$$\text{Saliency(sentence)} = \left(\sum_{w \in sentence} IDF(w)\right)^2$$

where N is the total number of documents in the collection and DF(w) is the number of documents in which the word w appears.

To make the clustering faster, in one embodiment, only the most salient sentences are used. As such, in operation 104, the sentences are pruned by sorting the sentences by saliency and discarding the sentences with low saliency relative to the top ones. For example, in one embodiment, sentences with less than 5% of the saliency of the top ones are removed from consideration. In operation 105, the sentences are clustered to group together similar sentences that differ from one another only by less-salient words. The similarity of sentences can be measured based on various text mining measures, and is described in more detail below.

In operation 106, the saliency of each cluster is computed based on text mining measures. According to one embodiment, the saliency of a cluster is constructed from a weighted sum of the saliencies of the sentences of the cluster:

$$S(\text{Cluster}) = \sum_{ngram \in cluster} \frac{\text{sentence weight}}{\text{cluster size}} \text{Saliency(sentence)}$$

In a manner similar to that described for sentence pruning, in one embodiment, only the top clusters will be presented to the user and clusters with lower saliencies may be pruned away.

In operation 107, the clusters are named with a sequence of words that is both informative and frequent in the cluster is selected. For all the sentences (or n-grams) in the clusters of orders $N_{clustering} \geq N \geq 2$, where N is the n-gram level, the length of the sentence, we compute:

$$TFIDF_{NG} = IDF_{NG}\sqrt{TF_{NG}}$$

where the IDF of an n-gram is defined above, and the TF of the n-gram is the number of times this n-gram appears in the cluster.

Note that this formulation balances between long and short sequences of words. Long sequences will a have larger IDF, since the IDF is constructed from the sum of word IDFs, but a lower TF. Short sequences will have a larger count (or TF) but lower IDF.

As such, the cluster can be named by the n-gram of the cluster having the largest $TFIDF_{NG}$.

According to one embodiment, a measure of similarity between n-grams is formulated in which two n-grams are more similar if they contain the same important words, and less similar if the important words are not shared between them. The following similarity measure Sim exhibits these characteristics:

$$\text{Both}(sent_1, sent_2) = \sum_{w \in both\ sentences} IDF(w)$$

$$S1Only(sent_1, sent_2) = \sum_{w \in sent_1\ but\ not\ sent_2} IDF(w)$$

-continued $$S2Only(sent_1, sent_2) = \sum_{w \in sent_2 \text{ but not } sent_1} IDF(w)$$

$$Sim(sent_1, sent_2) = \frac{Both(sent_1, sent_2)}{Both(sent_1, sent_2) + 0.5 \text{Max} \begin{pmatrix} S1Only(sent_1, sent_2), \\ S2Only(sent_1, sent_2) \end{pmatrix}}$$

where $sent_1$ and $sent_2$ are sentences to be compared in similarity.

Using this measure, saliency that is contained in both sentences will increase the similarity and saliency that is contained in only one of the sentences will decrease the similarity.

Figure 8:
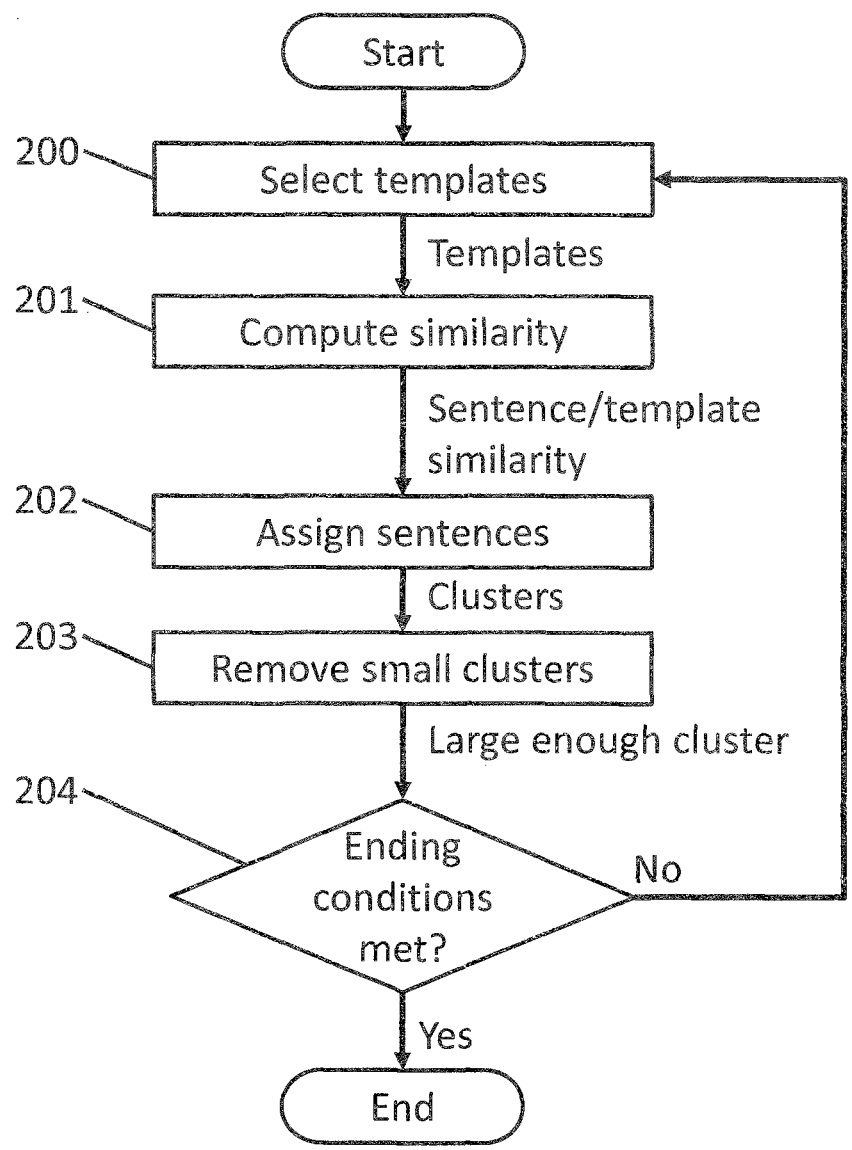
FIG. 8 is a flowchart illustrating a method for clustering sentences according to one embodiment of the present invention.

FIG. 8 is a flowchart illustrating a method executed by the analytics server 45 and the topic detecting module 45a for clustering sentences according to one embodiment of the present invention.

Referring to FIG. 8, in operation 200, sentences are randomly selected to serve as centers (templates) for the clusters. This is a standard procedure in clustering algorithms, however, in embodiments of the present invention, the centers are not numeric vectors (as would be typical), but instead are sequences of words, and the clustering process is based on words that occur in both sentences, in a way that somewhat resembles. See, e.g., H. Ye and S. Young, "A Clustering Approach to Semantic Decoding" ICSLP 2006, Pittsburgh, Pa. (2006), the entire disclosure of which is incorporated herein by reference.

In operation 201, each of the sentences involved in the clustering process is compared to each of the cluster centers (templates) using a similarity formula such as the sentence similarity function Sim described above.

In operation 202, each sentence is assigned to the cluster that has highest similarity to it, provided that this similarity is also greater than a threshold similarity (e.g., a predefined threshold).

In operation 203, the process removes templates to which very few sentences or sentences are assigned.

In operation 204, if all of the sentences have been tried as templates or a certain number of iterations have been reached, then the ending conditions have been satisfied, and the clustering process ends. If the ending conditions are not satisfied, then the process returns to operation 200 and selects additional sentences to serve as templates, where the additional sentences are randomly selected from the set of sentences that have not yet been tried as templates.

Therefore, embodiments of the present invention can automatically identify and assign names to new topics of conversation based on detecting related phrases and label (or tag or classify) interactions as involving these topics without manual entry of trigger phrases by a user.

According to another embodiment of the invention, a root cause mining procedure can be employed on the concepts and/or categories assigned in an earlier processing stage to infer association rules (for example, logical implication) between them. For example, an association rule between categories and/or concepts A, B, and C such as A, B→C, can indicate that the root cause of C is having A and B occurring in the same call or document prior to C. Here, A, B, and C can be predefined categories or newly discovered concepts, or a mixture thereof. For illustration this is described in FIG. 9. FIG. 9 is a screenshot illustrating a user interface for querying and viewing inferred association rules. The association rules are shown along with support and confidence levels of each of them, along with lift and saliency measures. Systems and methods for performing root cause analysis to generate the inferred association rules shown in FIG. 9 will be described below with respect to FIGS. 10, 11, and 12.

In another embodiment of the invention, the two approaches described above are combined: First, the user can select a category (e.g., category "C") and then choose to "search" for relationships to other categories. The root cause mining module 45b of the analytics server 45 then performs mining of association rules of categories that cause category C, i.e., rules having C on their right hand side (RHS) (for example B→C). For deeper investigation, the user can then choose to see the "buzz around relation." The root cause mining module 45b can then extract concepts only from the set of interactions having this relation, in a similar way to "Buzz around categories" as shown in FIG. 5, which is a screenshot illustrating an interface for exploring relationships between topics in a plurality of interactions according to one embodiment of the present invention. In addition, the root cause mining module 45b can be configured and constrained to look only on a part of an interaction that starts just before category B and ends just after category C.

In general, as used herein, a "term" (or "phrase") is a part of a "topic" and a "topic' a part of "category." The systems and methods described herein can be applied to any of these levels (term/phrase, topic, or category). For instance, the term "I want to speak to a supervisor" can be part of "Escalation" topic which can be part of a category "the customer asks to escalate more than once at the same call". Embodiments of the present invention can be applied to any and all of these levels and, for the sake of convenience, are described herein with respect to topics. However, embodiments of the present invention are not limited to use with topics and may be used at other levels, such as terms, phrases, and categories.

FIG. 9 is a screenshot listing deduced association rules between causes and events along with support, confidence, lift, and saliency levels for each of the derived inference rules according to one embodiment of the present invention. Support, confidence, lift, and saliency are computed metrics that may be viewed by a user to evaluate the quality of each of the derived inference rules and are described in more detail below. In this figure we present association rules between topics but association rules between terms/phrases or categories can be generated and used in substantially the same way. A user can search for rules relating to a particular topic (e.g., customer "Dissatisfaction") by selecting the topic from the "Target Topic" dropdown box, in which case rules containing "Dissatisfaction" on the "Right Hand Side" will be shown. A user can also restrict the results to rules matching particular criteria (e.g., minimum lift and/or minimum confidence). In the example shown in FIG. 9, only rules satisfying a minimum confidence of 70 were returned and, if the "Dissatisfaction" topic were selected under "Target Topic," only the rules "Transfer+Dispute→Dissatisfaction" and "No Payment+On Hold→Dissatisfaction" would be shown among the rules involving the "Dissatisfaction" concept.

As described above, embodiments of the present invention can be used to mine correlations and causal relationships between predefined topics or categories, between discovered concepts, or both. For the sake of convenience, the mined objects, whether they are instances of predefined topics or instances of discovered concepts, will be referred to as "elements."

Figure 10:
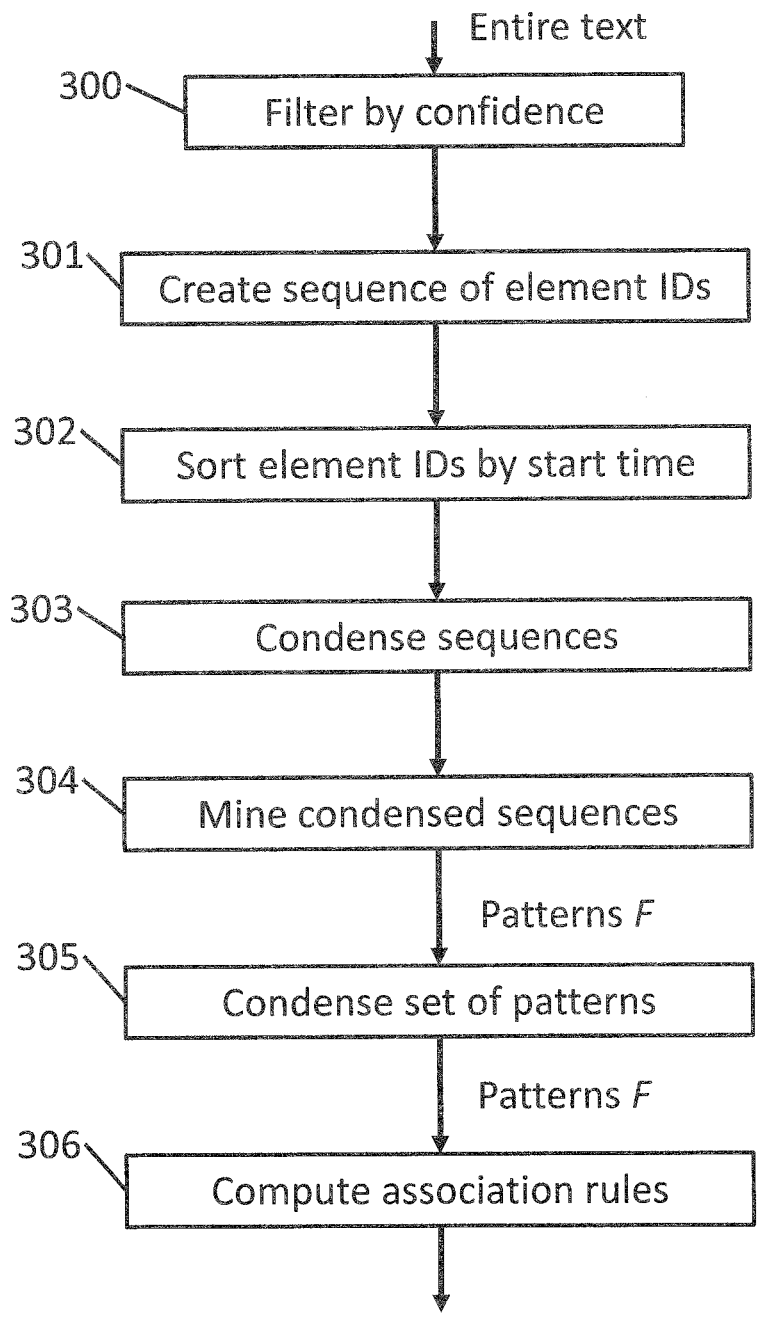
FIG. 10 is a flowchart illustrating a method for determining causes of events according to one embodiment of the present invention.

FIG. 10 is a flowchart illustrating a process executed by the analytics server 45 and the root cause mining module 45*b* for determining causes of events according to one embodiment of the present invention.

The set of documents to be analyzed can be the entire set of interactions or any subset of documents defined by the application or selected by the user (e.g., only calls, only chats, all interactions other than sales calls, etc.). To identify frequent sequences within the set of documents, for each document in a given set of documents, elements below a certain confidence value are filtered out in operation 300 and a sequence of element IDs, sorted by ascending element start time, is created in operations 301 and 302. In the case of topics or categories, the start time of the element is the recognition start time of the term contained in the topic. In the case of a discovered concept, for example a cluster of sentences, the element start time is the recognition start time of the first word in the sentence contained in the cluster. The set of sequences can then be condensed by eliminating occurrences of consecutive similar topics in operation 303.

The resulting set is then mined in operation 304 using an algorithm for mining frequent sequences such as PrefixSpan, (see Pei J, Han J, Mortazavi-Asl B, Wang J, Pinto H, Chen Q, Dayal U, Hsu M-C, *Mining Sequential Patterns by Pattern-Growth: The PrefixSpan Approach*, IEEE Trans. Knowl. Data Eng. 16:1424-1440 (2004)), resulting in a set F of patterns with support greater than a minimum support threshold s.

The set of patterns F is condensed in operation 305 by deleting sequences with repetitions (even non-consecutive ones). For example, the pattern (a, d, a, b) is not much more interesting than the pattern (a, d, b). In order to reduce the size of the output presented to the end user, the pattern (a, d, a, b) would be deleted. In addition, deleting non-repeating patterns can ensure that association rules derived from the pattern do not contain the same element in both the conditions (LHS) and the consequences (RHS). The pattern (a, d, a, b) can be removed from the set of patterns F without losing information regarding the relationship between elements {a, d, b} because both patterns (a, d, b) and (d, a, b) remain in the set F after condensing the set F.

More formally, given a set of frequent patterns F and a pattern p with a repetition of item e, the pattern p' created by removing the repetition e, exists in F:

$p \in F \Rightarrow sup(p) > s$ $p'$ is subsequence of $p \Rightarrow sup(p') \geq sup(p) > s \Rightarrow p' \in F$ where sup(p) is the support function, which is defined as the number of times pattern p appears in the across all documents.

Moreover, this procedure can be performed without updating the supports of (a, d, b) and (d, a, b) because every instance of (a, d, a, b) is already counted for the patterns (a, d, b) and (d, a, b).

After condensing the set of patterns in F in operation 305, association rules for the patterns in F are computed in operation 306.

Figure 11:
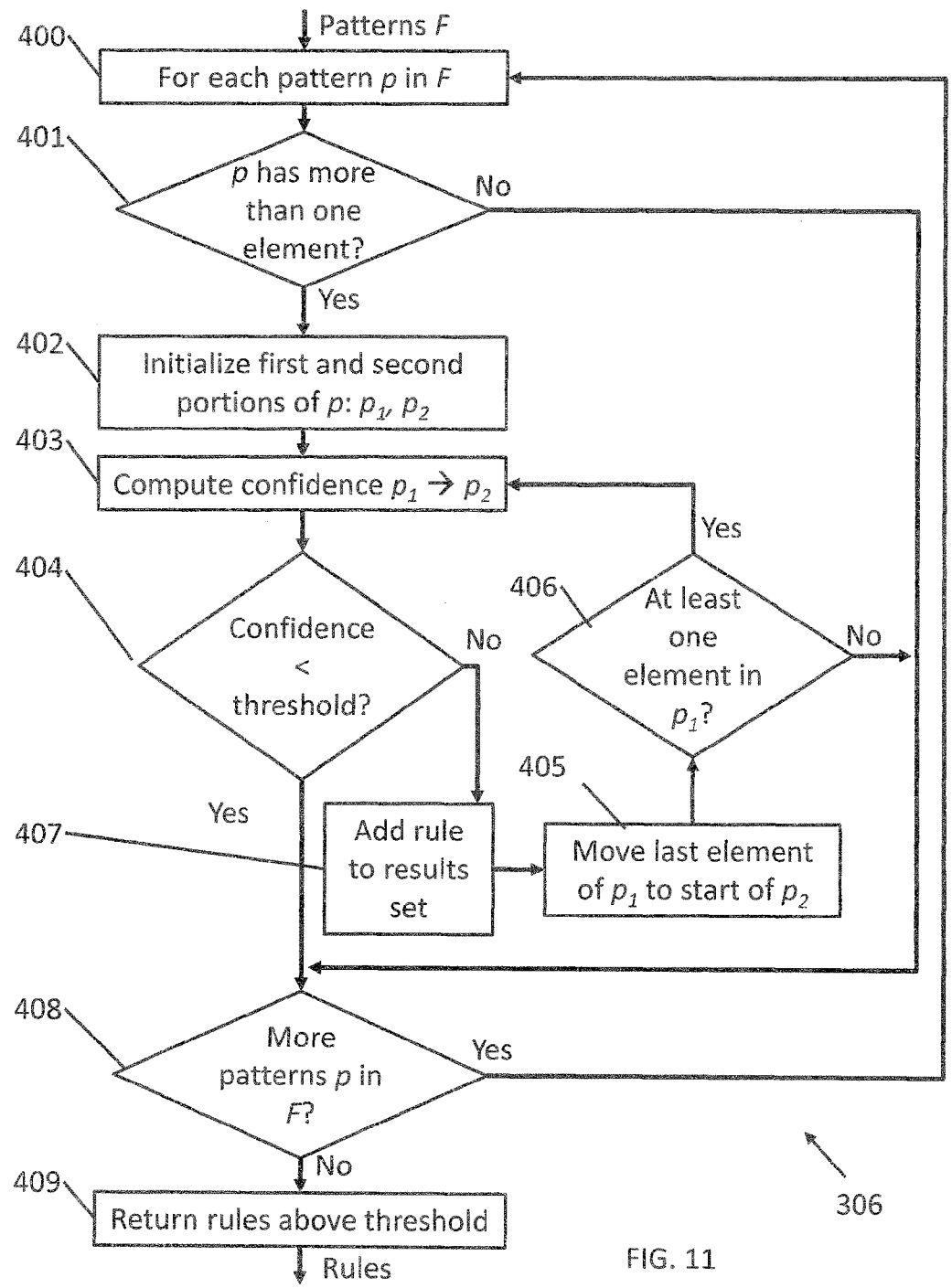
FIG. 11 is a flowchart illustrating a method for generating association rules according to one embodiment of the present invention.

FIG. 11 is a flowchart illustrating, in more detail, the operation of generating association rules 306 of the process shown in FIG. 10 according to one embodiment of the present invention. Referring to FIG. 11, according to another aspect of embodiments of the present invention, the association rules can be computed by the analytics server 45 and the topic detection module 45*a* according to the following method:

Patterns F that were mined in operation 304 (see FIG. 10) are processed in generating the association rules. For each sequence pattern p in patterns F (400), check the length of pattern p in operation 401. If p only has one element, then the pattern p is discarded and not considered and the process continues with the next pattern p in F (see operation 408). If p has more than one element, then p is split into a first portion $p_1$ (or "left-hand side" or LHS) and a second portion $p_2$ (or "right hand side" or RHS) to initialize the first and second portions $p_1$ and $p_2$ in operation 402, where $p_1$ is initialized to include all but the last element of p and $p_2$ is initialized to include only the last element of p.

An inference rule from the first portion $p_1$ to the second portion $p_2$ ($p_1 \rightarrow p_2$ or LHS→RHS) is generated and stored. A confidence of the inference rule is then computed in operation 403, where confidence is computed as:

$$Conf(LHS \Rightarrow RHS) = \frac{Sup(LHS, RHS)}{Sup(LHS)} = \frac{|(LHS, RHS)|}{|(LHS)|}$$

The confidence of a rule represents the probability of having its RHS in the documents, given that they contain its LHS. In other words, given the conditions (LHS), what is the probability to see the consequences (RHS) afterwards?

The computed confidence is compared with a threshold in operation 404 and, if the confidence is above a given threshold, then the rule is added to the results set in operation 407. To further generate more potential rules from the same pattern, the last element of $p_1$ is moved to the start of $p_2$. If this has not caused the $p_1$ to be empty (as checked in operation 406), a new inference rule is generated with the modified first and second portions $p_1$ and $p_2$ and the confidence of the new inference rule is computed in operation 403.

If the computed confidence is less than the threshold or if $p_1$ no longer has any elements, then generation of rules from the current pattern is stopped. If there are more patterns in F, as determined in operation 408, then the process continues with the next pattern in operation 401. Otherwise, the rules in the stored results set above the threshold are returned in operation 409.

In addition to computing the confidence in each of the rules, lift and saliency can also be computed for the rules, either in operation 403 or after the result set is returned in operation 409. The properties lift and saliency can be computed as follows:

$$Lift(LHS \Rightarrow RHS) = \frac{Conf(LHS \Rightarrow RHS)}{P(RHS)}$$

$$Saliency(pattern) = \sum_{e \in pattern} IDF(e)$$

Where $$IDF(e) = \log\left(\frac{N}{DF(e)}\right)$$

Where N is the total number of patterns in the collection and DF(e) is the number of patterns in which the element e appears. This formulation is very similar to the sentence saliency computation used for the clustering algorithm described above.

Lift is a measure of probabilistic dependence of the RHS on the LHS. Lower lift indicates that the events (that is, the LHS and RHS) are more independent; for example, having lift≤1. Higher lift indicates that they are more dependent on each other; for example, having lift>1.

Saliency is a measure of the amount of information contained in the pattern, given the whole set of patterns. It can be viewed as the relative importance or prominence of the pattern among all of the patterns that appear in the set. Higher saliency indicates that the pattern is more interesting.

Rules in the result set can also be sorted by confidence, lift, and saliency.

Figure 12:
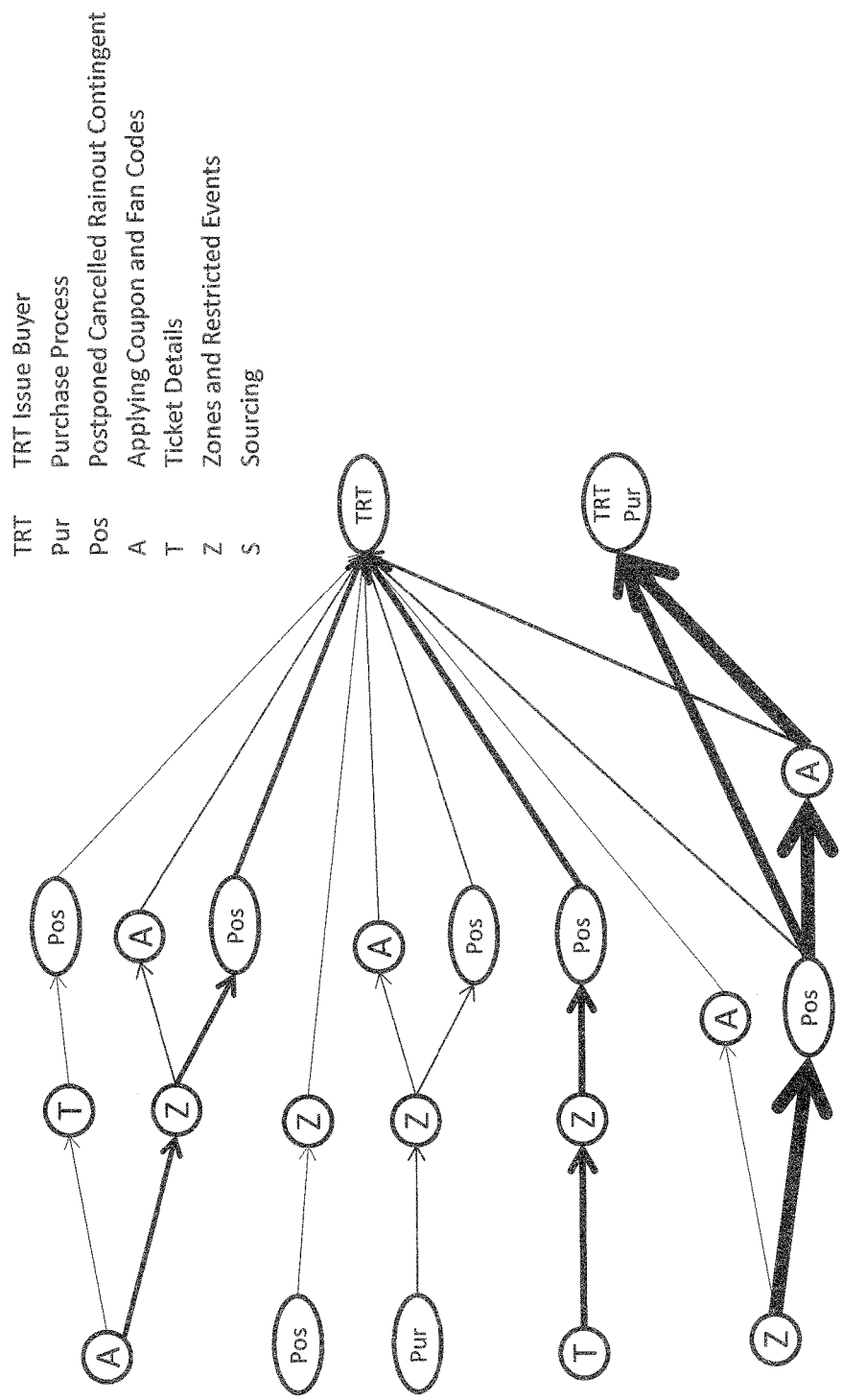
FIG. 12 is an illustration an output of the method for determining causes of events according to one embodiment of the present invention.

FIG. 12 is an illustration of an output of a root cause mining process as shown, for example, in FIGS. 10 and 11, according to one embodiment of the present invention. As shown in FIG. 12, each of the ovals represents a particular detected element or mined object, where the elements include:

TABLE 1

| TRT | TRT Issue Buyer |
| Pur | Purchase Process |
| Pos | Postponed Cancelled Rainout Contingent |
| A | Applying Coupon and Fan Codes |
| T | Ticket Details |
| Z | Zones and Restricted Events |
| S | Sourcing |

However, in other embodiments and when processing various other interactions in different contexts (e.g., customer support, sales of different products, etc.), different elements would appear in the patterns. Each path of arrows from left to right represents a different sequence of elements and darker or more strongly bolded arrows represent patterns that are better in terms of higher lift. As such, paths with more strongly bolded arrows indicate likely pathways between events that lead toward events on the right.

For example, the events "TRT, Pur" have strong connections with the path Z→Pos→A, suggesting that the sequence of "Zones and Restricted Events", then "Postponed Cancelled Rainout Contingent", and "Applying Coupon and Fan Codes" lead to the "Purchase Process" and "TRT Issue Buyer" events. When a user would like to explore ways to increase the number of interactions that result in the "Purchase Process" event, the user can supply a query to the analytics server 45 through the user interface module 45c (see, e.g., FIG. 9) to search for the "purchase process event" in the derived rules, the analytics server 45 can search the data structure illustrated in FIG. 12 to identify a set of events that generally lead to the desired event. As seen in FIG. 12, the above discussed path of Z→Pos→A and the path Z→Pos both leads strongly to the event TRT Pur and, if these paths satisfied the threshold conditions set by the user (e.g., minimum confidence levels), then these paths would be returned and displayed to the user, as seen in, for example, FIG. 9.

Embodiments of the invention can be practiced as methods or systems. Computer devices or systems including, for example, a microprocessor, memory, a network communications device, and a mass storage device can be used to execute the processes described above in an automated or semi-automated fashion. In other words, the above processes can be coded as computer executable code and processed by the computer device or system.

It should also be appreciated from the above that various structures and functions described herein may be incorporated into a variety of apparatus. In some embodiments, hardware components such as processors, controllers, and/or logic may be used to implement the described components or circuits. In some embodiments, code such as software or firmware executing on one or more processing devices may be used to implement one or more of the described operations or components.

As would be understood by one of ordinary skill in the art, the processes described herein and as illustrated in the flowcharts in the figures may be implemented by instructions stored in computer memory to control a computer processor to perform the described functions. In addition, steps and operations shown in the flowchart do not need to be executed in the order shown and person of ordinary skill in the art at the time the invention was made the order of the steps and operations performed may vary without deviating from or substantially altering the underlying technique.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for automatically performing voice interaction analytics by identifying concepts in a plurality of interactions between customers and agents of a contact center in a plurality of intervals, the method comprising:
   identifying, on a processor of a voice interaction analytics system, the interactions occurring in one of the plurality of intervals;
   creating, on the processor of the voice interaction analytics system, a plurality of sentences from the identified interactions;
   computing, on the processor of the voice interaction analytics system, a saliency of each the sentences;
   pruning away, on the processor of the voice interaction analytics system, sentences with low saliency for generating a set of informative sentences;
   comparing, on the processor of the voice interaction analytics system, the sentences of the set of informative sentences to identify a plurality of groups of similar sentences;
   generating, on the processor of the interaction analytics system, a plurality of sentence clusters, each of the sentence clusters corresponding to a concept of the concepts and comprising a group of similar sentences based on the interaction analytics of the plurality of interactions between customers and agents of the contact center;
   computing, on the processor of the voice interaction analytics system, a saliency of each of the sentence clusters;
   naming, on the processor of the voice interaction analytics system, each of the sentence clusters;
   identifying, on the processor of the voice interaction analytics system, a plurality of sentences of an interaction of the interactions;
   comparing, on the processor of the voice interaction analytics system, each of the sentences of the interaction with the plurality of sentence clusters to identify a plurality of matching sentence clusters;
   labeling, on the processor of the voice interaction analytics system, the interaction with a plurality of matching concepts, each matching concept corresponding to one of the matching sentence clusters based on the interaction analytics of the plurality of interactions between customers and agents of the contact center in a plurality of intervals; and displaying, on a display device, the number of interactions labeled with each of the matching concepts during the one of the plurality of intervals based on the interaction analytics of the plurality of interactions between customers and agents of the contact center.

2. The method of claim 1, wherein the interactions comprise an output of a voice recognition system.

3. The method of claim 2, further comprising filtering the output of the voice recognition system based on word confidence.

4. The method of claim 2, wherein the voice recognition system is a large-vocabulary continuous speech recognition system.

5. The method of claim 1, wherein the intervals are time intervals.

6. The method of claim 1, wherein the clustering the sentences comprises:
selecting a plurality of template sentences from the set of informative sentences, each of the template sentences corresponding to one of the clusters;
computing a similarity of each sentence in the set of informative sentences to the template sentences;
assigning each of the sentences of the set of informative sentences to a cluster of the clusters in accordance with the computed similarities with the template sentences; and
removing clusters having fewer than a threshold number of assigned sentences.

7. The method of claim 6, wherein the clustering the sentences further comprises, iteratively, selecting additional template sentences from sentences that were not assigned to a cluster and repeating the selecting the plurality of template sentences, computing the similarity of each sentence to the template sentences; the assigning the each of the sentences to the clusters; and removing clusters having fewer than the threshold number of assigned sentences until all sentences are assigned or until an iteration limit is reached.

8. The method of claim 1, wherein the naming each of the clusters comprises, for each cluster:
computing a term frequency-inverse document frequency for each sentence in the cluster and
naming the cluster with a sentence of the cluster having the highest term frequency-inverse document frequency.

9. The method of claim 1, further comprising, in response to generating at least one sentence cluster, outputting an alert, the alert comprising the name of the sentence cluster.

10. An automatic interaction analytics system configured to automatically perform voice interaction analytics by identifying concepts in a plurality of interactions between customers and agents of a contact center, the interaction analytics system comprising:
a processor; and
a memory, wherein the memory has stored thereon instructions that, when executed by the processor, causes the processor to perform voice analytics by identifying concepts in the plurality of voice interactions between the customers and the agents of the contact center in a plurality of intervals by:
identifying a plurality of voice interactions occurring in one of the plurality of intervals;
creating a plurality of sentences from the identified interactions;
computing a saliency of each the sentences;
pruning away sentences with low saliency for generating a set of informative sentences;
comparing the sentences of the set of informative sentences to identify a plurality of groups of similar sentences;
generating a plurality of sentence clusters, each of the sentence clusters corresponding to a concept of the concepts and comprising a group of similar sentences based on the voice interaction analytics of the plurality of interactions between customers and agents of the contact center;
computing a saliency of each of the sentence clusters;
naming each of the sentence clusters;
identifying a plurality of sentences of an interaction of the interactions;
comparing each of the sentences of the interaction with the plurality of sentence clusters to identify a plurality of matching sentence clusters;
labeling the interaction with a plurality of matching concepts, each matching concept corresponding to one of the matching sentence clusters based on the voice interaction analytics of the plurality of interactions between customers and agents of the contact center in a plurality of intervals; and
displaying, on a display device, the number of interactions labeled with each of the matching concepts during the one of the plurality of intervals based on the voice interaction analytics of the plurality of interactions between customers and agents of the contact center.

11. The voice interaction analytics system of claim 10, wherein the interactions comprise an output of a voice recognition system.

12. The voice interaction analytics system of claim 11, wherein the instructions further comprise instructions for filtering the output of the voice recognition system based on word confidence.

13. The voice interaction analytics system of claim 11, wherein the voice recognition system is a large-vocabulary continuous speech recognition system.

14. The voice interaction analytics system of claim 10, wherein the intervals are time intervals.

15. The voice interaction analytics system of claim 10, wherein the clustering the sentences comprises:
selecting a plurality of template sentences from the set of informative sentences, each of the template sentences corresponding to one of the clusters;
computing a similarity of each sentence in the set of informative sentences to the template sentences;
assigning each of the sentences of the set of informative sentences to a cluster of the clusters in accordance with the computed similarities with the template sentences; and
removing clusters having fewer than a threshold number of assigned sentences.

16. The voice interaction analytics system of claim 15, wherein the clustering the sentences further comprises, iteratively, selecting additional template sentences from sentences that were not assigned to a cluster and repeating the selecting the plurality of template sentences, computing the similarity of each sentence to the template sentences; the assigning the each of the sentences to the clusters; and removing clusters having fewer than the threshold number of assigned sentences until all sentences are assigned or until an iteration limit is reached.

17. The voice interaction analytics system of claim 10, wherein the naming each of the clusters comprises, for each cluster:
computing a term frequency-inverse document frequency for each sentence in the cluster and naming the cluster with a sentence of the cluster having the highest term frequency-inverse document frequency.

\* \* \* \* \*